United States Patent
Palinkas

(10) Patent No.: US 9,480,245 B1
(45) Date of Patent: Nov. 1, 2016

(54) FISHING ROD WITH TELESCOPING HANDLE

(71) Applicant: Keith A. Palinkas, Valrico, FL (US)

(72) Inventor: Keith A. Palinkas, Valrico, FL (US)

(*) Notice: Subject to any disclaimer, the term of this patent is extended or adjusted under 35 U.S.C. 154(b) by 845 days.

(21) Appl. No.: 13/652,921

(22) Filed: Oct. 16, 2012

(51) Int. Cl.
*A01K 87/08* (2006.01)
*A01K 87/02* (2006.01)

(52) U.S. Cl.
CPC .............. *A01K 87/08* (2013.01); *A01K 87/025* (2013.01)

(58) Field of Classification Search
CPC .... A01K 87/025; A01K 87/02; A01K 87/00; A01K 87/08
USPC ............... 43/18.1, 18.1 R, 18.1 CT, 23, 25
See application file for complete search history.

(56) References Cited

U.S. PATENT DOCUMENTS

| | | | | |
|---|---|---|---|---|
| 1,441,045 A | * | 1/1923 | Tredwell | 285/302 |
| 1,625,510 A | * | 4/1927 | Tredwell | 403/52 |
| 1,839,751 A | * | 1/1932 | Fenton | A01K 87/08 43/23 |
| 2,088,132 A | * | 7/1937 | Domecq | A01K 87/00 43/23 |
| 2,874,507 A | * | 2/1959 | Faber et al. | 43/18.1 CT |
| 3,416,255 A | * | 12/1968 | Johnson | 43/18.5 |
| 3,445,952 A | * | 5/1969 | Ferman | 43/18.5 |
| 4,490,063 A | * | 12/1984 | Aho | 403/109.8 |
| 4,637,157 A | * | 1/1987 | Collins | A01K 87/06 43/22 |
| 5,175,952 A | * | 1/1993 | Yamato | 43/18.1 R |
| 5,259,140 A | * | 11/1993 | Epperson | 43/18.1 CT |
| 5,369,904 A | * | 12/1994 | Vogts | A01K 87/00 43/18.1 R |
| 5,577,338 A | * | 11/1996 | Matsumoto et al. | 43/18.1 HR |
| 6,973,750 B1 | * | 12/2005 | Kim | 43/23 |
| 7,416,490 B2 | * | 8/2008 | Parsons et al. | 463/47.7 |
| 2014/0298708 A1 | * | 10/2014 | Arola et al. | 43/24 |
| 2014/0360085 A1 | * | 12/2014 | Stender | 43/18.1 CT |

* cited by examiner

*Primary Examiner* — Darren W Ark
*Assistant Examiner* — Michael Wang
(74) *Attorney, Agent, or Firm* — Nicholas Pfeifer; Ronald E. Smith; Smith & Hopen, P.A.

(57) ABSTRACT

A telescoping handle for a fishing rod includes a first cylinder having a first diameter, a second cylinder having a diameter greater than that of the first cylinder, and a third cylinder having a diameter greater than that of the second cylinder. The lumen of the second cylinder receives the first cylinder and the lumen of the third cylinder receives the second cylinder. The fishing rod has a butt end received within the first cylinder. An annular flange is formed in the proximal end of the first cylinder, a flexible and resilient material is wrapped around the distal end of the first cylinder and a radially inwardly extending annular crimp which the annular flange abuts is formed in the second cylinder. A cam is inserted into the lumen of the second cylinder at its distal end and locks the handle in its retracted or extended position and any intermediate position.

7 Claims, 3 Drawing Sheets

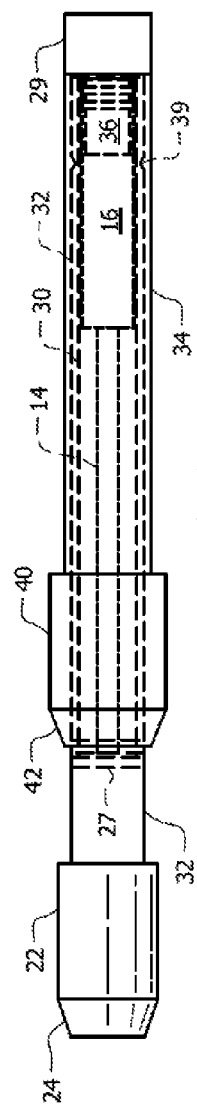
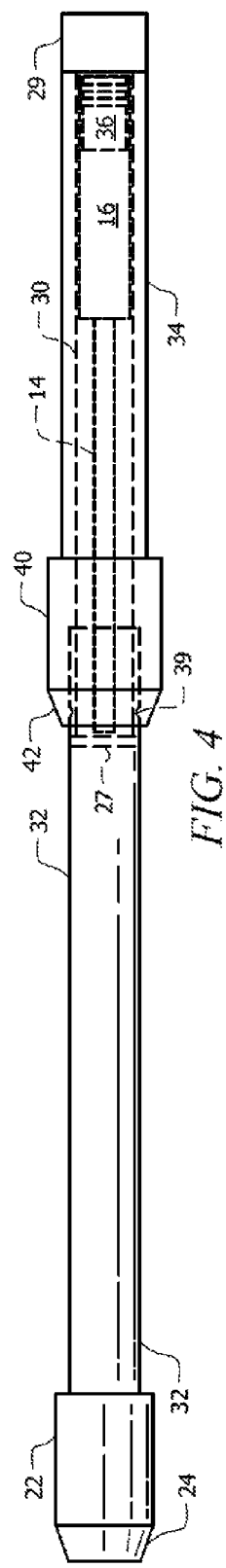
FIG. 3
FIG. 4

FISHING ROD WITH TELESCOPING HANDLE

BACKGROUND OF THE INVENTION

1. Field of the Invention

This invention relates to fishing rods. More specifically, it relates to a fishing rod with a telescoping and lockable handle.

2. Brief Description of the Related Art

Telescoping tools such as paint brush handles, swimming pool brush handles, and the like, are well known. All of such prior art tools are formed by two telescoping cylindrical members of differing diameters that are separated from one another along their respective lengths by a clearance space. A cylindrical cam having an eccentric locking surface is positioned in the clearance space in surrounding relation to the innermost cylindrical member and in surrounded relation to the outermost cylindrical member.

The cylindrical members can be positioned in an infinite number of functional positions of adjustment relative to one another when neither cylindrical member is rotated. Relative rotation of the cylindrical members in a first rotational direction causes the eccentric cam to lock the cylindrical members against further telescoping movement. Relative rotation of the cylindrical members in a second rotational direction, opposite to the first, causes the eccentric cam to unlock the cylindrical members, thereby allowing further telescoping movement.

Fishing rod manufacturers must manufacture many differing lengths of fishing rods in order to meet the demand for rods of differing lengths. A manufacturer can never know how many rods of each length will sell, so there is a constant effort to manage the inventory of rods of differing lengths in an effort to adjust the supply to the demand.

Even after a rod has been purchased, there are times when the user wishes the rod were longer or shorter, depending upon the type of fish or weight of fish being caught. When battling a large, deep sea fighting fish, for example, a user will place the proximal end of the handle against his or her stomach in an effort to acquire greater leverage over the rod. At such times, the user may wish that the rod were longer or shorter, depending upon the feel of the fish at the end of the line.

When fishing for smaller fish, a user may tire of holding a long rod for extended periods of time and wish that a shorter rod was available. If a short rod is being used, the hooking of a strong fish may cause the user to desire a longer rod.

Inventors have therefore developed telescoping rods that enable a user to quickly lengthen or shorten a rod. Such telescoping is achieved by using the well-known telescoping technique, mentioned above, that is used with extendable paint brush handles, swimming pool brushes, and the like.

A manufacturer of such telescoping rods need not keep a large number of rods of differing length in inventory since one telescoping rod can supplant several non-telescoping rods of differing lengths.

One problem with such telescoping rod sections is that the handle of the fishing rod is designed for use when the fishing rod has a particular length. Shortening or lengthening a rod causes the rod to be unbalanced and the user can feel such lack of balance.

Another problem is that making rod sections that telescopically interlock with one another adds considerable cost to the rod. For example, if three telescoping rod sections are provided, the cost of two (2) eccentric cams is added to the manufacturing cost of the fishing rod.

Thus there is a need for a fishing rod that can be manufactured in one section with no telescoping sections of the rod but which can be extended and retracted to provide a plurality of lengths.

There is also a need for a fishing rod that can be extended or shortened without compromising the balance of the rod.

However, in view of the art considered as a whole at the time the present invention was made, it was not obvious to those of ordinary skill in the field of this invention how such a rod could be provided.

BRIEF SUMMARY OF THE INVENTION

The long-standing but heretofore unfulfilled need for a telescoping fishing rod that does not have the drawbacks of conventional telescoping rods is now met by a new, useful, and nonobvious invention.

The novel telescoping handle for a fishing rod includes a first cylinder having a first diameter, a second cylinder having a diameter greater than that of the first cylinder and a third cylinder having a diameter greater than that of the second cylinder. The second cylinder has a lumen that slidingly receives the first cylinder with a small clearance, and the third cylinder has a lumen that slidingly receives the second cylinder with a small clearance.

A fishing rod has a butt end formed by two sections. The butt end is slidingly received within a lumen of the first cylinder and is secured therewithin.

An annular flange is formed in the proximal end of the first cylinder. A flexible and resilient material is wrapped around the distal end of said the first cylinder to effectively increase the diameter of the distal end. The material recovers its full diameter after being momentarily compressed radially inwardly.

A radially inwardly extending annular crimp is formed in the second cylinder near a distal end of the second cylinder. A flange abuttingly engages the crimp when the first cylinder is slidingly introduced into the lumen of the second cylinder so that a majority of the length of the first cylinder extends distally out of the lumen when the flange abuts the crimp.

A cam of cylindrical construction is inserted into the distal end of the second cylinder until the proximal end of the cam abuts the annular crimp. The cam has a lumen having a diameter that is slightly greater than the external diameter of the first cylinder so that the first cylinder is slideably received within the lumen of the cam.

The cam is slideably received within the lumen of the second cylinder so that the cam ensleeves the first cylinder and is ensleeved by the second cylinder so that the first and second cylinders are slideable with respect to one another as long as neither cylinder is rotated substantially.

Relative rotation in a first direction causes the eccentric cam to lock the first and second cylinders to one another so that further longitudinal sliding is not possible in the absence of extreme longitudinally directed force, and relative rotation in a second direction opposite to the first causes the eccentric cam to unlock the first and second cylinders from one another so that further longitudinal sliding is possible with minimal longitudinally directed force.

The distal end of the first cylinder is taped with a suitable flexible and resilient material to increase its diameter only after the first cylinder has been inserted into the lumen of the second cylinder.

The connector has a lumen with a diameter-reducing downward taper secured to the proximal end of the third cylinder by a press fit. The connector is not fully being seated onto the third cylinder. The proximal end of the third cylinder is inserted about half-way into the lumen of the connector so that tape occupies the proximal end of said connector. The tape is prevented from exiting the proximal end because it abuts the downward taper. The tape is momentarily compressed radially inwardly when it is introduced into the lumen by a strong longitudinal force but it rebounds to its position of repose so that it cannot pass through the downward taper in an opposite direction unless subjected to a very strong longitudinal force in the opposite direction from the inserting force.

The tape may extend distally beyond the distal end of the third cylinder or it may be flush with the distal end. The tape joins the first cylinder to the third cylinder so that the first and third cylinders move conjointly with one another. Longitudinal displacement of the third cylinder therefore effects simultaneous and corresponding longitudinal displacement of the first cylinder and rotational movement of the third cylinder effects simultaneous and corresponding rotational displacement of the first cylinder.

Relative rotation of the third cylinder and hence of the first cylinder in a first direction locking the structure, and relative rotation of the third cylinder and hence of the first cylinder in a second direction opposite to the first direction unlocking the structure so that the third cylinder and the first cylinder are telescopically adjusted with respect to the second cylinder.

BRIEF DESCRIPTION OF THE DRAWINGS

For a fuller understanding of the invention, reference should be made to the following detailed description, taken in connection with the accompanying drawings, in which:

FIG. 3 is a side elevational view of the novel structure in its assembled configuration when fully retracted; and FIG. 4 is a side elevational view of the novel structure in its assembled configuration when fully extended.

DETAILED DESCRIPTION OF THE PREFERRED EMBODIMENT

Figure 1A:
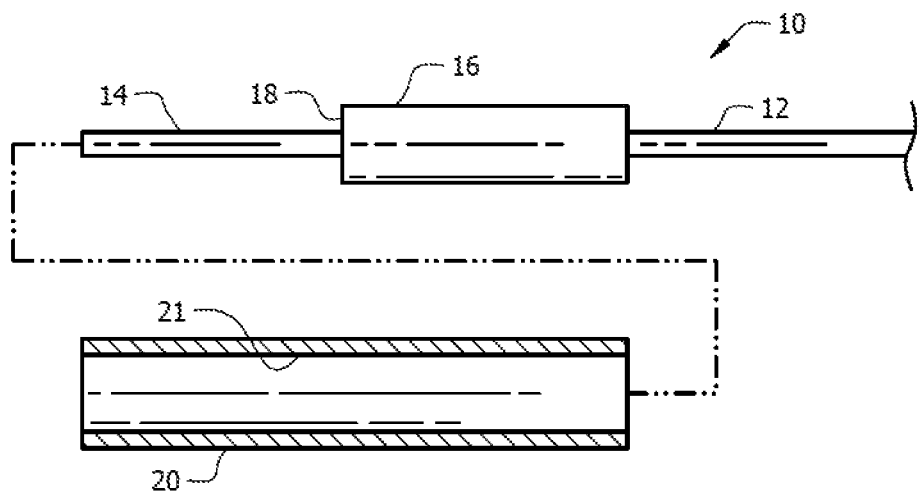
FIG. 1A is a side elevational assembly view of a prior art fishing rod handle.
Figure 1B:
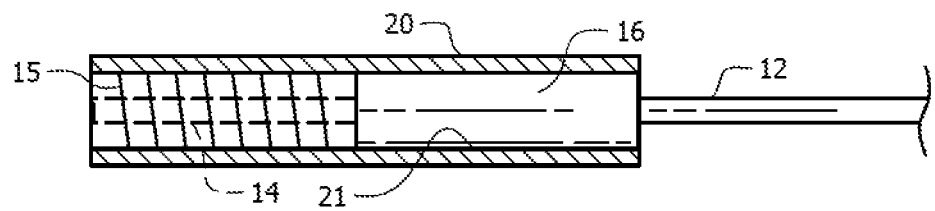
FIG. 1B is a longitudinal sectional view of the assembled prior art structure of FIG. 1A.

A prior art structure is denoted as a whole in FIGS. 1A and 1B by the reference numeral 10.

Conventional fishing rod 10 has an elongate rod section 12 having an increased diameter proximal end 16 and said proximal end 16 has a decreased diameter section 14. Annular step 18 is formed where increased diameter section 16 meets decreased diameter section 14. Together, parts 14 and 16 are known in the industry as the butt end of rod 12.

Tubular handle 20 having lumen 21 slidingly receives the butt end as indicated by the assembly lines in FIG. 1A.

As depicted in FIG. 1B, prior to insertion of said butt end into lumen 21, tape 15 is wound about reduced diameter section 14 until the diameter of said reduced diameter section is effectively substantially equal to the diameter of section 16. This ensures a very tight press fit between lumen 21 and the butt end of rod 12. Instead of tape 15, cork or other suitable filler material may be used to create the desired tight press fit. Adhesives may also be added to increase the connection between the butt end and lumen 21.

The conventional handle of FIGS. 1A and 1B cannot be made in telescoping form. The structure is designed to provide a strong fit between the butt end of rod 12 and handle 20 so that the two do not separate from one another.

The novel handle, as depicted in FIGS. 2-5, also provides a strong interconnection between handle 20 and rod 12.

The novel handle provides a telescoping function so that there is no need to provide telescoping rod sections 12 with multiple eccentric locking cams as in the prior art. Only one eccentric locking cam is needed in the novel structure and said cam is positioned within handle 20, not rod 12. This provides the user with a rod that is extendable and retractable without sacrificing balance.

Figure 2:
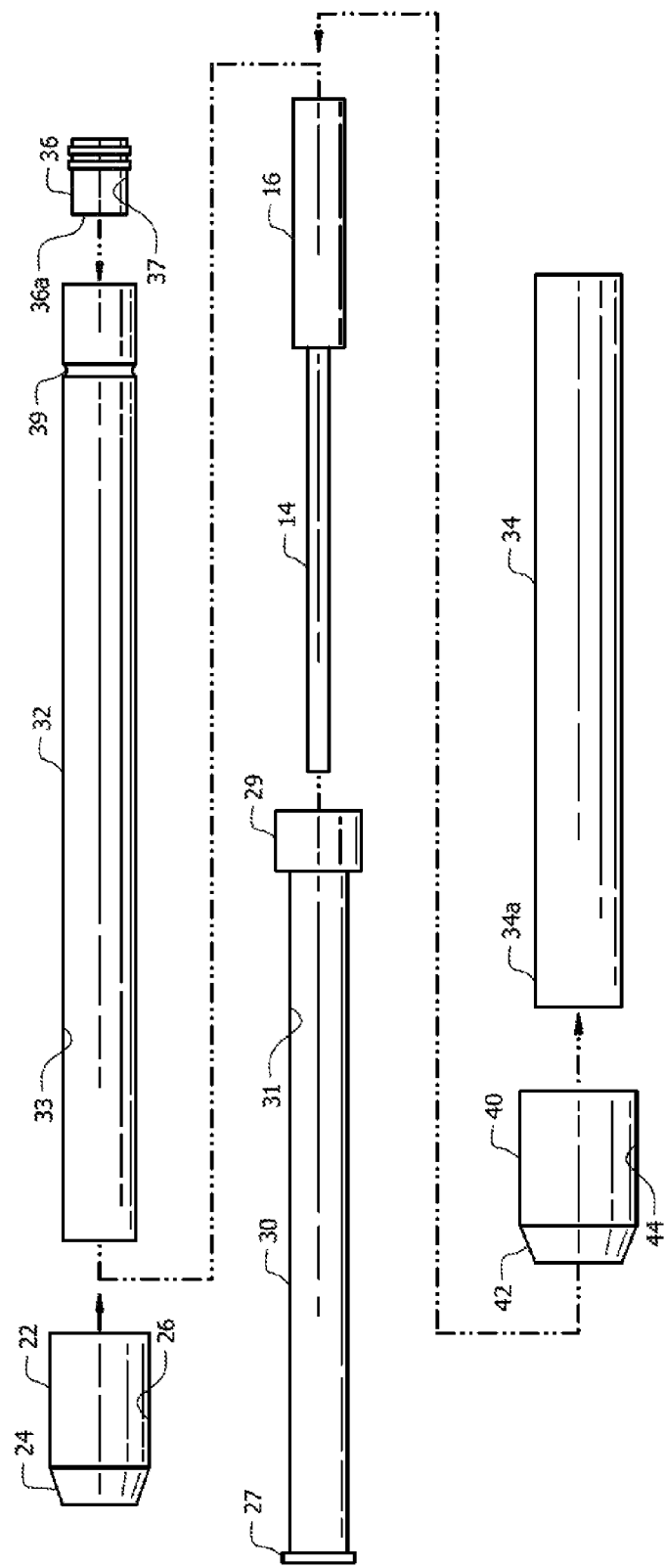
FIG. 2 is a side elevational assembly view of the novel fishing rod handle.

As best understood in connection with FIG. 2, the novel telescoping handle includes three cylindrical parts, denoted 30, 32, and 34. Cylinder 30, also referred to as the first cylinder, has the smallest diameter of the three cylindrical parts, cylinder 32, also referred to as the second cylinder, has a diameter greater than that of cylinder 30, and cylinder 34, also referred to as the third cylinder, has a diameter greater than that of cylinder 32. The lumen of second cylinder 32 thus slidingly receives first cylinder 30 with a small clearance and the lumen of third cylinder 34 slidingly receives second cylinder 32 with a small clearance. The clearance is about the same as the clearance provided in well-known telescoping tools as mentioned in the prior art discussion above.

The butt end of rod 12, formed by sections 14 and 16, is slidingly received within lumen 31 of small diameter cylinder 30 and is secured therein in the conventional way mentioned above.

First tubular handle 22 having downwardly-tapered proximal end 24 includes lumen 26 that slideably but tightly receives the proximal end of second tube 32.

Annular flange 27 is formed in the proximal end of cylinder 30. Tape 29 or other suitable material is wrapped around the distal end of cylinder 30 to effectively increase the diameter of said distal end. The material chosen to increase said diameter must be flexible and resilient so that it may recover its full diameter after it is momentarily compressed radially inwardly.

Radially inwardly extending annular crimp 39 is formed in second cylinder 32 near its distal end. Flange 27 abuttingly engages said crimp when cylinder 30 is slidingly introduced into lumen 33 of cylinder 32 as indicated by the assembly lines of FIG. 2. Accordingly, when flange 27 abuts crimp 39, the majority of the length of small cylinder 30 extends distally out of lumen 33.

Cam 36 is also of cylindrical construction. It is inserted into the distal end of cylinder 32 until proximal end 36a abuts annular crimp 39. Lumen 37 of cam 36 is slightly greater than the external diameter of cylinder 30 so that said cylinder 30 is slideably received within lumen 37 of cam 36. Cam 36 is slideably received within lumen 33 of cylinder 32, i.e., cam 36 ensleeves cylinder 30 and is ensleeved by cylinder 32. Accordingly, cylinders 30 and 32 are slideable with respect to one another as long as neither cylinder is rotated substantially. Relative rotation in a first direction causes eccentric cam 36 to lock said cylinders 30, 32 to one another so that further longitudinal sliding is not possible in the absence of extreme longitudinally directed force, and relative rotation in a second direction opposite to the first causes eccentric cam 36 to unlock said cylinders 30, 32 from one another so that further longitudinal sliding is possible with minimal longitudinally directed force.

The distal end of cylinder 30 is taped as at 29 or otherwise treated with a different but suitable flexible and resilient material to increase its diameter as aforesaid but only after cylinder 30 has been inserted into lumen 33 of cylinder 32. If taped prior to such insertion, crimp 39 will prevent passage of tape 29 through lumen 33.

Connector 40 is a second tubular handle. It has diameter-reducing taper 42 and lumen 44 is secured to proximal end 34*a* of third cylinder 34 by a press fit. However, connector 40 is not fully seated onto said third cylinder 34. As depicted in FIGS. 3-5, proximal end 34*a* of cylinder 34 is inserted about half-way into lumen 41 of connector 40. Tape 29 thus occupies the proximal end of connector 40 and said tape is prevented from exiting said proximal end because it abuts downward taper 42.

Tape 29 is momentarily compressed radially inwardly when it is introduced into lumen 41 by a strong longitudinal force but it rebounds to its position of repose and cannot pass through downward taper 42 in an opposite direction unless subjected to a very strong longitudinal force in the opposite direction form the inserting force.

FIG. 3 depicts the novel structure in its fully retracted configuration and FIG. 4 depicts said novel structure in its fully extended configuration.

Note in FIGS. 3 and 4 that tape 29 extends distally beyond the distal end of large cylinder 34. Tape 29 can also be flush with said distal end. The purpose of tape 29, or other suitable flexible and resilient material, is to join cylinder 30 to cylinder 34 so that said cylinders move conjointly, i.e., longitudinal displacement of cylinder 34 effects simultaneous and corresponding longitudinal displacement of cylinder 30 and rotational movement of cylinder 34 effects simultaneous and corresponding rotational displacement of cylinder 30.

Relative rotation of cylinder 34 (and hence cylinder 30 that rotates conjointly therewith) in a first direction locks the structure in either of said depicted positions or any position intermediate thereof, and relative rotation of cylinder 34 (and hence cylinder 30 that rotates conjointly therewith) in a second direction opposite to the first direction unlocks the structure so that cylinder 34 and cylinder 30 that moves conjointly therewith can be telescopically adjusted with respect to cylinder 32.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

What is claimed is:

1. A telescoping handle for a fishing rod, comprising:
a first cylinder having a first diameter;
a second cylinder having a diameter greater than that of said first cylinder;
a third cylinder having a diameter greater than that of said second cylinder;
said first cylinder having a lumen that slidingly receives a butt end of a fishing rod, and said butt end being secured therein;
said second cylinder having a lumen that slidingly receives said first cylinder with a small clearance, and said second cylinder adapted to longitudinally slide outwardly in a proximal direction towards a user of said fishing rod to increase a length of said telescoping handle;
said third cylinder having a lumen that slidingly receives said second cylinder with a small clearance;
said lumen of said third cylinder ensleeves said first cylinder, such that said third cylinder is longitudinally fixed with respect to a longitudinal location of said first cylinder;
an annular flange formed in the proximal end of said first cylinder;
a flexible and resilient material wrapped around the distal end of said first cylinder to effectively increase the diameter of said distal end, said material recovering its full diameter after being momentarily compressed radially inwardly;
a radially inwardly extending annular crimp formed in said second cylinder near a distal end of said second cylinder;
said annular flange abuttingly engaging said crimp when said first cylinder is slidingly introduced into said lumen of said second cylinder so that a majority of the length of said first cylinder extends distally out of said lumen when said annular flange abuts said crimp;
a cam of cylindrical construction that is inserted into the distal end of said second cylinder until a proximal end of said cam abuts said annular crimp;
said cam having a lumen with a diameter that is slightly greater than the external diameter of said first cylinder so that said first cylinder is slideably received within said lumen of said cam;
said cam being slideably received within said lumen of said second cylinder so that said cam ensleeves said first cylinder and is ensleeved by said second cylinder so that said first and second cylinders are slideable with respect to one another as long as neither cylinder is rotated substantially, thereby enabling said second cylinder to extend outwardly in a proximal direction towards a user operating said fishing rod to increase the length of said telescoping handle;
whereby relative rotation in a first direction causes said cam to lock said first and second cylinders to one another so that further longitudinal sliding is not possible in the absence of extreme longitudinally directed force, and relative rotation in a second direction opposite to the first causes said cam to unlock said first and second cylinders from one another so that further longitudinal sliding is possible with minimal longitudinally directed force.

2. The telescoping handle of claim 1, further comprising:
said distal end of said first cylinder being taped with a suitable flexible and resilient material to increase its diameter only after said first cylinder has been inserted into the lumen of said second cylinder.

3. The telescoping handle of claim 1, further comprising:
a connector having a lumen with a diameter-reducing downward taper being secured to the proximal end of said third cylinder by a press fit;
said connector not fully being seated onto said third cylinder;
said proximal end of said third cylinder being inserted about half-way into the lumen of said connector so that tape occupies the proximal end of said connector and said tape is prevented from exiting said proximal end because it abuts said downward taper;
said tape being momentarily compressed radially inwardly when it is introduced into said lumen by a strong longitudinal force but rebounding to its position of repose so that it cannot pass through said downward taper in an opposite direction unless subjected to a very strong longitudinal force in the opposite direction from the inserting force.

4. The telescoping handle of claim 3, further comprising:
said tape extending distally beyond the distal end of said third cylinder;
said tape joining said first cylinder to said third cylinder so that said first and third cylinders move conjointly with one another, longitudinal displacement of said third cylinder effecting simultaneous and corresponding longitudinal displacement of said first cylinder and rotational movement of said third cylinder effecting simultaneous and corresponding rotational displacement of said first cylinder;
whereby relative rotation of said third cylinder and hence said first cylinder that rotates conjointly therewith in a first direction locking the structure, and relative rotation of said third cylinder and hence of said first cylinder in a second direction opposite to the first direction unlocking the structure so that said third cylinder and said first cylinder are telescopically adjusted with respect to said second cylinder.

5. The telescoping handle of claim 3, further comprising:
said tape being flush with the distal end of said third cylinder.

6. A telescoping handle for a fishing rod, comprising:
a first cylinder having a first diameter;
a second cylinder having a diameter greater than that of said first cylinder;
a third cylinder having a diameter greater than that of said second cylinder;
said second cylinder having a lumen that slidingly receives said first cylinder with a small clearance;
said third cylinder having a lumen that slidingly receives said second cylinder with a small clearance;
said lumen of said third cylinder ensleeves said first cylinder, such that said third cylinder is longitudinally fixed with respect to a longitudinal location of said first cylinder;
said first cylinder having a lumen that slidingly receives a butt end of a fishing rod and secures said butt end therein;
an annular flange formed in the proximal end of said first cylinder;
a flexible and resilient material wrapped around the distal end of said first cylinder to effectively increase the diameter of said distal end, said material recovering its full diameter after being momentarily compressed radially inwardly;
a radially inwardly extending annular crimp formed in said second cylinder near a distal end of said second cylinder;
said annular flange abuttingly engaging said crimp when said first cylinder is slidingly introduced into said lumen of said second cylinder so that a majority of the length of said first cylinder extends distally out of said lumen when said annular flange abuts said crimp;
a cam of cylindrical construction that is inserted into the distal end of said second cylinder until a proximal end of said cam abuts said annular crimp;
said cam having a lumen with a diameter that is slightly greater than the external diameter of said first cylinder so that said first cylinder is slideably received within said lumen of said cam;
said cam being slideably received within said lumen of said second cylinder so that said cam ensleeves said first cylinder and is ensleeved by said second cylinder so that said first and second cylinders are slideable with respect to one another as long as neither cylinder is rotated substantially;
whereby relative rotation in a first direction causes said cam to lock said first and second cylinders to one another so that further longitudinal sliding is not possible in the absence of extreme longitudinally directed force, and relative rotation in a second direction opposite to the first causes said cam to unlock said first and second cylinders from one another so that further longitudinal sliding is possible with minimal longitudinally directed force.

7. An accessory for a fishing rod, comprising:
a telescoping handle attachable to a butt end of said fishing rod, wherein said telescoping handle further includes:
a first cylinder having a first diameter;
a second cylinder having a diameter greater than that of said first cylinder;
a third cylinder having a diameter greater than that of said second cylinder;
said second cylinder having a lumen that slidingly receives said first cylinder with a small clearance;
said third cylinder having a lumen that slidingly receives said second cylinder with a small clearance, thereby allowing said second cylinder to extend outwardly in a proximal direction towards a user of said fishing rod;
said lumen of said third cylinder ensleeves said first cylinder, such that said third cylinder is longitudinally fixed with respect to a longitudinal location of said first cylinder, and said second cylinder remains free to longitudinally slide outwardly in a proximal direction to extend a length of said telescoping handle;
said first cylinder having a lumen that slidingly receives a butt end of a fishing rod and secures said butt end therein;
an annular flange formed in the proximal end of said first cylinder; and
a cam inserted into the distal end of said second cylinder with said first cylinder slideably received within a lumen of said cam, whereby relative rotation in a first direction causes said cam to lock said first and second cylinders such that longitudinal sliding between said second cylinder and said first cylinder is not possible in the absence of extreme longitudinally directed force, and relative rotation in a second direction opposite to the first causes said cam to unlock said first and second cylinders from one another so that further longitudinal sliding is possible with minimal longitudinally directed force.

* * * * *